(12) United States Patent
Ariyoshi et al.

(10) Patent No.: US 11,970,405 B2
(45) Date of Patent: Apr. 30, 2024

(54) METHOD FOR PRODUCING LITHIUM CARBONATE

(71) Applicant: JX METALS CORPORATION, Tokyo (JP)

(72) Inventors: Hirotaka Ariyoshi, Hitachi (JP); Isao Tomita, Hitachi (JP); Hiroshi Abe, Hitachi (JP)

(73) Assignee: JX METALS CORPORATION, Tokyo (JP)

( * ) Notice: Subject to any disclaimer, the term of this patent is extended or adjusted under 35 U.S.C. 154(b) by 578 days.

(21) Appl. No.: 17/271,701

(22) PCT Filed: Aug. 29, 2019

(86) PCT No.: PCT/JP2019/034018
§ 371 (c)(1),
(2) Date: Feb. 26, 2021

(87) PCT Pub. No.: WO2020/045596
PCT Pub. Date: Mar. 5, 2020

(65) Prior Publication Data
US 2021/0316998 A1    Oct. 14, 2021

(30) Foreign Application Priority Data
Aug. 31, 2018 (JP) .................. 2018-163502

(51) Int. Cl.
*C01D 15/08* (2006.01)
*H01M 10/54* (2006.01)

(52) U.S. Cl.
CPC ............ *C01D 15/08* (2013.01); *H01M 10/54* (2013.01)

(58) Field of Classification Search
CPC ..................................... C01D 15/08
See application file for complete search history.

(56) References Cited

U.S. PATENT DOCUMENTS 4,355,906 A * 10/1982 Ono .................. B01F 33/4534
366/274
6,835,228 B1 12/2004 Lin et al.
8,992,665 B2 * 3/2015 Yamaguchi ............. C22B 7/006
210/660

FOREIGN PATENT DOCUMENTS

| CN | 102432043 A | 5/2012 |
|---|---|---|
| CN | 104241724 A | 12/2014 |
| CN | 106129511 A | 11/2016 |
| CN | 108011150 A | 5/2018 |
| JP | 4-49489 B2 | 8/1992 |
| JP | 11-310414 A | 11/1999 |
| JP | 2005-149889 A | 6/2005 |
| JP | 2009-193778 A | 8/2009 |
| JP | 4581553 B2 | 11/2010 |
| JP | 2012-92004 A | 5/2012 |
| JP | 2014-162982 A | 9/2014 |
| JP | 2015-195129 A | 11/2015 |
| WO | WO 2011/082444 A1 | 7/2011 |

OTHER PUBLICATIONS

International Search Report, issued in PCT/JP2019/034018, PCT/ISA/210, dated Nov. 26, 2019.
English translation of the International Preliminary Report on Patentability and Written Opinion of the International Searching Authority (Forms PCT/IB/338, PCT/IB/373 and PCT/ISA/237) for International Application No. PCT/JP2019/034018, dated Mar. 11, 2021.
Extended European Search Report for corresponding European Application No. 19855519.5, dated Jun. 15, 2022.

* cited by examiner

*Primary Examiner* — Stuart L Hendrickson
(74) *Attorney, Agent, or Firm* — Birch, Stewart, Kolasch & Birch, LLP

(57) ABSTRACT

Provided is a method for producing lithium carbonate from lithium ion battery waste, the lithium ion battery waste including battery positive material components containing Li and at least one metal selected from the group consisting of Co, Ni and Mn, wherein, after subjecting the lithium ion battery waste to a wet process, thereby separating the at least one metal of the battery positive material components from the lithium ion battery waste to obtain crude lithium carbonate, the method includes: a dissolution step of dissolving the crude lithium carbonate in a liquid while feeding a carbon dioxide gas; and a decarbonization step of heating a lithium dissolved solution obtained in the dissolution step to release carbonic acid, and wherein when dissolving the crude lithium carbonate in the liquid in the dissolution step, the liquid is stirred in a reaction vessel using a stirrer, and a ratio of a diameter (d) of a stirring blade of the stirrer to an inner diameter (D) of the reaction vessel (d/D) is from 0.2 to 0.5.

12 Claims, 10 Drawing Sheets

METHOD FOR PRODUCING LITHIUM CARBONATE

FIELD OF THE INVENTION

This specification discloses an art relating to a method for producing lithium carbonate by subjecting lithium ion battery waste including battery positive electrode material components containing certain metals to a wet treatment.

BACKGROUND OF THE INVENTION

For example, recently, it has been widely studied that valuable metals such as nickel and cobalt are recovered from lithium ion battery waste and the like discarded for reasons such as expired product life by means of a wet process or the like, in terms of effective utilization of resources.

As a specific example of such recovery of valuable metals, first, the lithium ion battery waste is calcined and then subjected to crushing and sieving in this order to remove a certain degree of aluminum as an impurity (see Patent Literature 1).

Subsequently, battery powder obtained under a sieve for the sieving is leached by adding it to a leaching solution, whereby lithium, nickel, cobalt, manganese, copper, aluminum and the like which can be contained in the battery powder are dissolved in the solution. The respective metal elements dissolved in the leached solution are then separated and recovered. Here, in order to separate the respective metal elements dissolved in the leached solution, the leached solution is subjected to multiple stages of solvent extraction and back extraction (see Patent Literatures 2 to 4).

CITATION LIST

Patent Literatures

[Patent Literature 1] Japanese Patent Application Publication No. 2015-195129 A
[Patent Literature 2] Japanese Patent Application Publication No. 2005-149889 A
[Patent Literature 3] Japanese Patent Application Publication No. 2009-193778 A
[Patent Literature 5] Japanese Patent No. 4581553 B

SUMMARY OF THE INVENTION

Technical Problem

Crude lithium carbonate obtained by carrying out the wet process as described above has relatively low quality of lithium. Therefore, purification may be required depending on applications in order to improve the quality of lithium It is believed that in the purification it is effective to carry out a dissolution step of dissolving crude lithium carbonate in a liquid while feeding a carbon dioxide gas, followed by a decarbonization step of heating a Li dissolved solution obtained in the dissolution step to release carbonic acid and precipitating Li ions in the Li dissolved solution as lithium carbonate, in order to remove impurities contained in the crude lithium carbonate.

However, there is a problem that a reaction efficiency of a carbon dioxide gas cannot be sufficiently increased even if the carbon dioxide gas is simply passed through the liquid in the above dissolution step.

This specification proposes a method for producing lithium carbonate, which can effectively increase a gas reaction efficiency when dissolving crude lithium carbonate in a liquid while feeding the carbon dioxide gas, in order to solve the above problems.

Solution to Problem

The method for producing lithium carbonate disclosed in this specification relates to a method for producing lithium carbonate from lithium ion battery waste, the lithium ion battery waste comprising battery positive material components containing Li and at least one metal selected from the group consisting of Co, Ni and Mn,
wherein, after subjecting the lithium ion battery waste to a wet process, thereby separating the at least one metal of the battery positive material components from the lithium ion battery waste to obtain crude lithium carbonate, the method comprises:
a dissolution step of dissolving the crude lithium carbonate in a liquid while feeding a carbon dioxide gas; and
a decarbonization step of heating a lithium dissolved solution obtained in the dissolution step to release carbonic acid, and
wherein when dissolving the crude lithium carbonate in the liquid in the dissolution step, the liquid is stirred in a reaction vessel using a stirrer, and a ratio of a diameter (d) of a stirring blade of the stirrer to an inner diameter (D) of the reaction vessel (d/D) is from 0.2 to 0.5.

Advantageous Effects of Invention

According to the above method for producing lithium carbonate, in the dissolution step, the liquid is stirred in the reaction vessel using the stirrer, and the ratio of the diameter (d) of the stirring blade of the stirrer to the inner diameter (D) of the reaction vessel (d/D) is from 0.2 to 0.5, whereby the gas reaction efficiency can be effectively increased.

DETAILED DESCRIPTION OF THE INVENTION

Hereinafter, embodiments of the invention disclosed in this specification will be described in detail.

Figure 1:
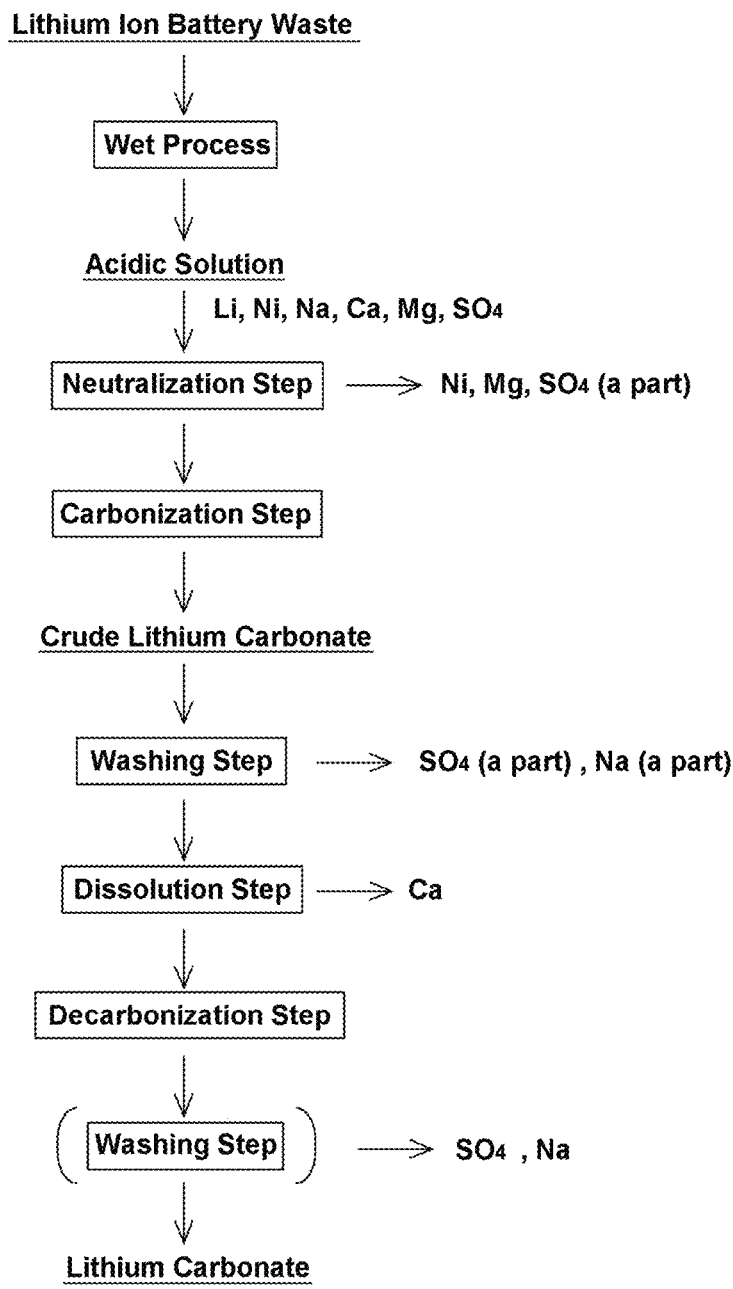
FIG. 1 is a flow chart showing a method for producing lithium carbonate according to an embodiment.

As illustrated in FIG. 1, a method for producing lithium carbonate according to an embodiment includes carrying out a neutralization step and a carbonation step in this order for an acidic solution after subjecting lithium ion battery waste to a predetermined wet process, and further subjecting the resulting crude lithium carbonate to a washing step, a dissolution step and a decarbonization step in this order. Lithium carbonate can be thus produced. Here, among these steps, the dissolution step of dissolving the crude lithium carbonate while feeding a carbon dioxide gas is important, although details will be described later, and the purpose is to improve a reaction efficiency of the carbon dioxide gas at this time.

(Lithium Ion Battery Waste)

Lithium ion battery waste is waste of lithium ion batteries that can be used in various machines or devices such as mobile phones and other various electronic devices, as well as motor vehicles. Specific example of waste include waste discarded or recovered due to the life of battery products, manufacturing defects, or other reasons. Such lithium ion battery waste is targeted, whereby effective utilization of resources can be achieved.

The Lithium ion battery waste may contain positive electrode active materials which are lithium metal salts containing Mn, Ni and Co, as well as negative electrode materials containing C (carbon), Fe and Cu, and aluminum foils (positive electrode substrates) having positive electrode active materials applied and attached by, for example, polyvinylidene fluoride (PVDF) or other organic binders, and housings containing aluminum for outer packaging enclosing the lithium ion battery waste. Specifically, the lithium ion battery waste may include a single metal oxide composed of one element and/or a composite metal oxide composed of two or more elements of Li, Ni, Co and Mn forming the positive electrode active materials, as well as Al, Cu, Fe, C and the like.

In this embodiment, the lithium ion battery waste includes battery positive electrode material components containing at least one metal selected from the group consisting of Co, Ni and Mn, and Li, and in some cases it may further contain at least one metal selected from the group consisting of Al, Cu, Fe and C.

The Lithium ion battery waste may have been subjected to preprocessing such as, for example, a calcination process of heating the waste in a heating facility at a predetermined temperature and time, a crushing process using a rotor rotating type or impact type crusher after the calcination, and a sieving process of sieving the crushed granular powder through a sieve having predetermined openings. Such preprocessing can result in a form of the lithium ion battery waste in which the binder that binds the aluminum foils to the positive electrode active materials is decomposed, and Al, Cu, and the like are removed, as well as the battery positive electrode material components are easily dissolved by leaching in the wet process.

(Wet Process)

In the wet process, the lithium ion battery waste as described above is generally leached with an acid such as sulfuric acid, hydrochloric acid or other mineral acid. Here, a hydrogen peroxide solution may be added in order to facilitate dissolution of the metals contained in the lithium ion battery waste. This can result in a leached solution in which the metals in the lithium ion battery waste are dissolved.

The leached solution is then subjected to neutralization, sulfurization or solvent extraction to remove, for example, Fe, Al, Cu, and the like, and at least one of Co, Ni, and Mn remaining in the solution is then sequentially collected by solvent extraction/back extraction, or the like, under conditions depending on each metal.

(Acidic Solution)

An acidic solution is obtained by subjecting the above lithium ion battery waste to the wet process, and is a solution in which Li and impurities are dissolved.

An example of such an acidic solution includes a Ni extracted solution obtained after extracting nickel by solvent extraction for recovering nickel among a plurality of steps of solvent extraction or neutralization subjected to the leached solution in the above wet process, and a Ni electrolyzed solution obtained after subjecting the nickel to extraction and back extraction, and further electrolytic winning to recover the nickel.

In addition, the acidic solution that can be used includes a Li leached solution obtained by adding the above lithium ion battery waste to water or the like and mainly leaching the lithium into water or the like. In this case, the wet process means that the lithium in the lithium ion battery waste is leached into water or the like.

The Ni electrolyzed solution has a pH of, for example, −1 to 2, and generally 0 to 1, and the Ni extracted solution as described above has a pH of, for example, 1 to 4, and generally 2 to 3, and the Li leached solution described above has a pH of, for example, 9 to 13, and generally 10 to 12.

The above Ni extracted solution, Ni electrolyzed solution, and Li leached solution can be used after concentrating lithium by solvent extraction, as needed. In general, the concentrating of lithium results in an acidic solution having a pH of about 0 to 1, for example.

The impurities contained in the acidic solution include, among the components contained in the lithium ion battery waste, those remaining without being separated by the wet process. Specifically, in the embodiment shown in FIG. 1, the acidic solution contains Ni, Na, Ca, Mg and $SO_4$ as impurities together with Li.

The acidic solution contains Li ions, for example, in a concentration of from 2 g/L to 20 g/L, and typically from 5 g/L to 12 g/L, and Ni ions, for example, in a concentration of from 50 g/L to 150 g/L, and typically from 70 g/L to 100 g/L. In particular, when the acidic solution is the above electrolyzed solution, the Ni ions are often in such a concentration range.

The acidic solution may further contain Na ions, for example, in a concentration of from 30 g/L to 70 g/L, and typically from 40 g/L to 60 g/L, and Ca ions, for example, in a concentration of from 0.001 g/L to 0.1 g/L, and typically from 0.01 g/L to 0.05 g/L, Mg ions, for example, in a concentration of from 0.01 g/L to 10 g/L, and typically from 0.05 g/L to 5 g/L, and $SO_4$ ions, for example, in a concentration of from 1 g/L to 200 g/L, and typically from 10 g/L to 100 g/L.

Among them, the Mg ions that can be contained in the acidic solution remains without being removed by the method until lithium carbonate is purified, causing deterioration of quality. Therefore, it is suitable that the Mg ions are removed by a neutralization step as described later as in this embodiment. The Mg ions may be more typically contained in a concentration of from 0.1 g/L to 2 g/L, and even from 0.2 g/L to 2 g/L.

Examples of ions that can be contained in the acidic solution include Co, Mn, Si, and Cl, although these are not present in the embodiment as shown in FIG. 1.

(Neutralization Step)

An alkali is added to the acidic solution as described above to neutralize the acidic solution, thereby precipitating the Ni ions and the Mg ions in the acidic solution as solids, which are separated and removed by solid-liquid separation. As a result, the Ni ions and Mg ions are removed to obtain a neutralized solution containing lithium ions.

The alkali used in the neutralization step is not particularly limited as long as it can effectively increase the pH of the acidic solution, and examples thereof include NaOH, $Ca(OH)_2$, CaO, and $CaCO_3$. When a Ca salt is used, the $SO_4$ ions that can be contained in the acidic solution are converted into $CaSO_4$ with the Ca salt, which can also be removed by solid-liquid separation.

Among the Ca salts, $Ca(OH)_2$ is particularly preferable in terms of reaction control and prevention of scaling of equipment. In addition, since CaO generates heat during addition, scales are generated inside the equipment, which may reduce an actual volume of the reaction vessel and clog the piping. There is a concern that $CaCO_3$ cannot increase the pH to a predetermined level.

However, with the Ca salt, an amount of a neutralized material may be increased and a larger filter may be required. Therefore, from this point of view, it is preferable to use NaOH. The NaOH can also effectively remove the $SO_4$ ions.

An amount of the alkali added is preferably from 1.0 to 1.5-fold mol equivalent of an amount required for neutralizing the Ni ions, the Mg ions and free acids that can be contained in the acidic solution. If the amount of the alkali added is too low, there is a concern that some of the Ni ions, the Mg ions, and the free acids will not be precipitated and removed. On the other hand, if the amount of the alkali added is too high, costs may be simply increased and an amount of residues generated may be increased, leading to deterioration of filterability. From this point of view, the amount of the alkali added is preferably 1.1-fold mol equivalent to 1.2-fold molar equivalent.

By thus adding the alkali to the acidic solution, the pH of the acidic solution after the addition of the alkali is preferably from 12.0 to 13.0. If the pH of the acidic solution after the addition of the alkali is too low, the removal of Ni and Mg as components to be removed may be insufficient, which may cause deterioration of the quality of lithium carbonate. On the other hand, if the pH of the acidic solution after the addition of alkali is too high, amphoteric metals may be redissolved when the solution contains the amphoteric metals as impurities.

Here, in the removal of Ni contained in the acidic solution, when the acidic solution does not contain the Mg ions, the pH of the acidic solution after the addition of the alkali can be from 9 to 10.5, preferably from 10.0 to 10.5, in order to remove the Ni ions effectively.

On the other hand, when the acidic solution contains the Mg ions, Mg is also precipitated by adjusting the pH of the acidic solution after addition of the alkali to 12 to 13, and the Mg can also be removed together with Ni. From this point of view, the pH of the acidic solution after the addition of the alkali is more preferably from 12.0 to 13.0, and even more preferably from 12.0 to 12.5.

After the addition of the alkali to the acidic solution, the acidic solution can be stirred for a predetermined period of time to facilitate the reaction. From the viewpoint of improving a reaction efficiency, it is preferable that a relatively strong stirring is carried out at a relatively high temperature.

After precipitating Ni and Mg as given compounds such as hydroxides by the addition of the alkali, solid-liquid separation can be carried out using a known device or method such as a filter press or a thickener to separate a precipitate and a neutralized solution. The precipitate contains compounds of Ni and Mg. On the other hand, in the neutralized solution, substantially all of Ni and Mg are removed, and Li exists in a dissolved state.

The Ni concentration in the neutralized solution is preferably 5 mg/L or less, and particularly preferably 1 mg/L or less, and the Mg concentration is preferably 5 mg/L or less, and particularly preferably 1 mg/L or less. It is preferable to remove Ni and Mg as much as possible in the neutralization step.

(Carbonization Step)

The neutralized solution obtained by removing nickel in the above neutralization step is subjected to a carbonization step to carbonize Li contained in the neutralized solution to obtain crude lithium carbonate once, which has lower quality than that of lithium carbonate that will be finally obtained.

Here, in order to carbonize Li in the neutralized solution, the Li ions in the neutralized solution are recovered as crude lithium carbonate by adding a carbonate salt to the neutralized solution or blowing a carbon dioxide gas into the neutralized solution. From the viewpoint of preventing an increase of impurities, it is preferable to blow the carbon dioxide gas, because the addition of the carbonate salt results in the addition of impurity components.

When the carbonate salt is added to the neutralized solution, examples of the carbonate salt include sodium carbonate and the like. Specifically, for example, in an assumed reaction: $Li_2SO_4 + Na_2CO_3 \rightarrow Li_2CO_3 + Na_2SO_4$, the carbonate salt having from 1.0 to 2.0-fold mol equivalent, preferably from 1.0 to 1.2-fold mol equivalent can be added based on Li in the neutralized solution. If the amount of the carbonate salt added is too low, there is a concern that Li in the neutralized solution cannot be converted to lithium carbonate to lose it. On the other hand, if it is too high, an amount of sodium sulfate mixed in lithium carbonate will increase, which requires any enhanced washing in the subsequent step, so that an increased loss of Li solved in a washing solution may be caused.

After the addition of the carbonate salt or the blowing of the carbon dioxide gas, for example, the solution may be stirred as needed at a temperature in a range of from 50° C. to 90° C., and maintained at this temperature for 0.5 to 2 hours, typically 1 hour.

(Washing Step)

In a washing step, the crude lithium carbonate obtained in the above carbonization step is washed. Here, an object of the washing step is to remove mainly at least a part of $SO_4$ and further at least a part of Na, among impurities contained in the crude lithium carbonate. In particular, at this stage, as the quality of $SO_4$ contained in the crude lithium carbonate is decreased, the quality of $SO_4$ of lithium carbonate finally obtained through a dissolution step and a decarbonization step as described later can be significantly reduced, which is effective.

More specifically, the crude lithium carbonate can be subjected to repulping with washing water such as pure water which is 0.5 to 2 times, preferably 1 to 1.5 times a wet weight of the crude lithium carbonate. If the amount of pure water used for washing is too high, there is a concern about loss of Li due to the higher solubility of the crude lithium carbonate. On the other hand, if the amount of pure water is too low, it is considered that $SO_4$ cannot be removed as expected. As used herein, the wet weight means a weight (kg-wet) of undried lithium carbonate recovered by solid-liquid separation after carbonization.

As used herein, the repulping means that a cake obtained after solid-liquid separation is introduced into a predetermined amount of water, and then stirred and formed into a slurry, and subjected to the solid-liquid separation operation again. Further, the pure water means water that does not contain at least Mg, preferably further Na and Ca.

A temperature at the time of washing is preferably from 50° C. to 90° C., and a washing time is preferably from 0.5 hour to 1 hour. It is considered that if the temperature is beyond this range, the solubility of lithium carbonate will increase and the dissolution loss will increase on the lower temperature side, and impurities will be reconcentrated due to volatilization of water on the higher temperature side, which are inconvenient. Also, if the time is beyond that range, there are possibilities that washing with water will be insufficient on the shorter time side and costs will increase on the longer time side.

It is preferable that the washing operation as described above is carried out a plurality of times. This is because when the washing operation is carried out once and the amount of pure water with respect to the wet weight as described above is increased, the loss of Li in the washing water is increased when reducing the predetermined $SO_4$ quality to a certain level, due to the higher solubility of the crude lithium carbonate. From this point of view, the number of washing operations is preferably 2 to 3, and particularly preferably 2. If the number of washing operations is too large, the dissolution loss of Li in the washing water will be increased.

(Dissolution Step)

The crude lithium carbonate that has undergone the washing step is subjected to a dissolution step of dissolving the crude lithium carbonate in a liquid while feeding a carbon dioxide gas.

More specifically, for example, the crude lithium carbonate can first be repulped with a liquid such as pure water. The carbon dioxide gas is then blown into the liquid to feed it, and carbonic acid is dissolved in the liquid. As a result, the crude lithium carbonate is dissolved in the liquid by the reaction: $Li_2CO_3+H_2CO_3 \rightarrow 2LiHCO_3$ to provide a Li dissolved solution as a lithium hydrogen carbonate solution. As used herein, the word "repulped" means that a cake obtained after solid-liquid separation is introduced into a predetermined amount of water and then stirred to form a slurry.

Figure 2:
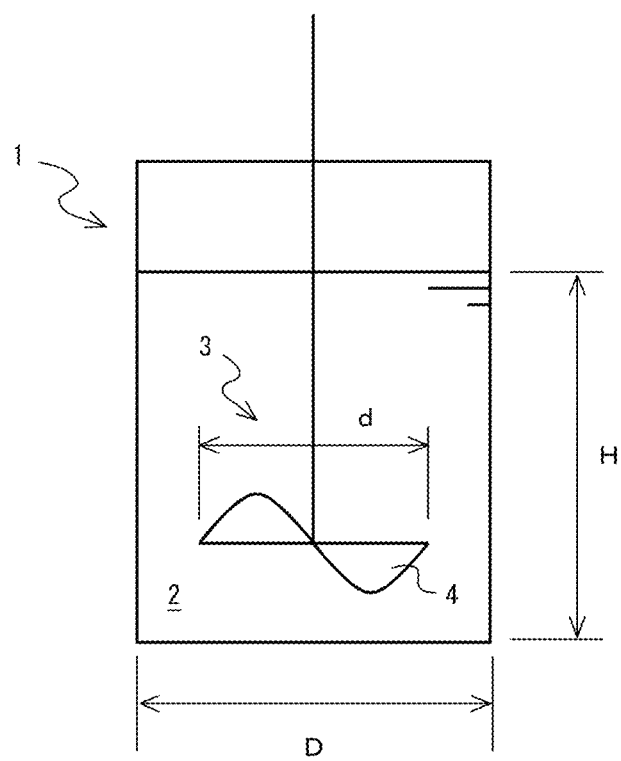
FIG. 2 is a schematic view of a reaction vessel that can be used in a dissolution step.
Figure 3:
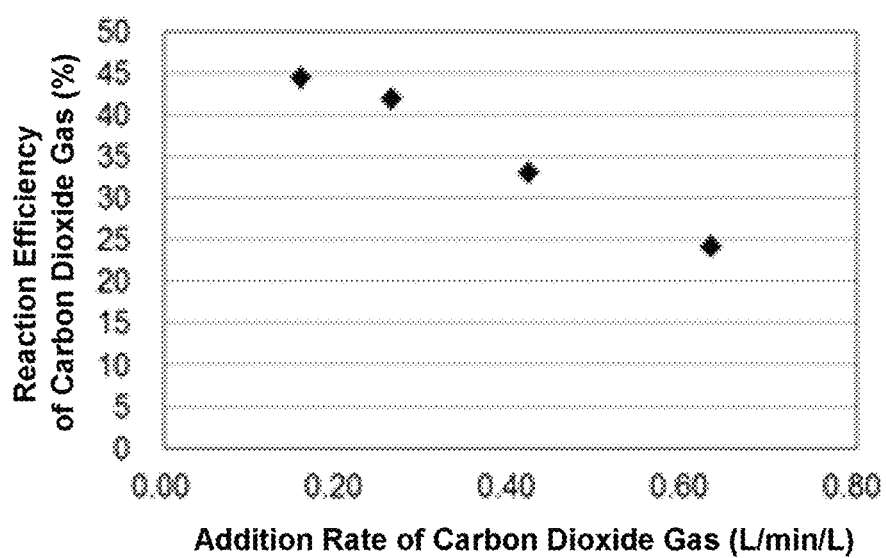
FIG. 3 is a graph showing a change in a reaction efficiency of a carbon dioxide gas with respect to a change in a feed rate of a carbon dioxide gas in Example.

Here, in this embodiment, when the crude lithium carbonate is dissolved in the liquid, a liquid 2 into which the crude lithium carbonate has been introduced is stirred with a stirrer 3 in a reaction vessel 1 as shown in the schematic view of FIG. 3. At this time, as viewed in a direction orthogonal to a rotation axis of a stirring blade 4 of the stirrer 3 (the left-right direction in FIG. 2), a ratio of a diameter (d) of the stirring blade 4 to an inner diameter (D) of the reaction vessel 1 having a cylindrical shape or the like (d/D) is from 0.2 to 0.5. The diameter (d) of the stirring blade 4 refers to a length of a line segment that passes through the center of rotation of the stirring blade 4 and connects end points to each other, which end points are on the outermost position in the radial direction of the stirring blade 4 across the center of rotation.

As a result, the carbon dioxide gas is dispersed in the liquid 2 and a bubble diameter of the carbon dioxide gas becomes finer, resulting in a decreased residence time of the carbon dioxide gas in the liquid, an increased contact area and the like, which can significantly increase an efficiency of reaction of the crude lithium carbonate with the carbon dioxide gas. If the ratio (d/D) of the diameter (d) of the stirring blade 4 to the inner diameter (D) of the reaction vessel 1 is too low, there is a concern that a power required for increasing the reaction efficiency will increase. On the other hand, if the ratio (d/D) is too high, it may be difficult to control the system when trying to reduce the bubble diameter of the carbon dioxide gas in order to increase the reaction efficiency. From this point of view, the ratio (d/D) of the diameter (d) of the stirring blade 4 to the inner diameter (D) of the reaction vessel 1 is more preferably from 0.3 to 0.4.

From the viewpoint of effectively making the bubbles of the carbon dioxide gas in the liquid 2 finer, the stirrer 3 preferably has a turbine-type stirring blade 4 having a larger shearing capacity. Although not shown, the turbine-type stirring blade 4 includes a stationary blade for rectifying a fluid and a moving blade for compressing the fluid or converting an energy of the fluid to rotational motion.

Further, it is preferable that a ratio (P/V) of a stirring power (P) of the stirrer 3 to a volume (V) of the liquid 2 with the crude lithium carbonate introduced may be from 0.3 $kW/m^3$ to 1.0 $kW/m^3$. If this ratio (P/V) is too high, operating costs may increase, and if it is too low, the reaction efficiency may decrease. Therefore, the above ratio (P/V) is particularly preferably from 0.5 $kW/m^3$ to 0.8 $kW/m^3$. Here, the stirring power (P) is calculated by the equation: $P=Np \times n^3 \times d^5$ from the number of power (Np), the number of rotations (n) of the stirrer 3 and the diameter (d) of the stirring blade 4. Among them, the number of power (Np) is a value inherent in a blade shape of the stirring blade 4. For the cylindrical reaction vessel 1, the volume (V) of the liquid 2 can be calculated by the equation: $V=(D/2)^2 \times \pi \times H$ from the inner diameter (D) of the reaction vessel 1 and a height (H) of the liquid 2 in the reaction vessel 1.

Further, a peripheral speed of the stirrer 3 is preferably from 1.3 m/s to 1.9 m/s, and more preferably from 1.4 m/s to 1.8 m/s. This is because if the peripheral speed is slower, the reaction efficiency may decrease, and if the peripheral speed is higher, the operating costs may increase. The peripheral speed means a blade tip speed $(m/s)=\pi(pi) \times$ blade diameter $(m) \times$ rotation speed $(s^{-1})$.

By stirring as described above, the reaction efficiency of the carbon dioxide gas can be effectively increased. Therefore, in this embodiment, it is not necessary to use any ion exchange resin or the like for suppressing the impurity quality. As a result, a cost required for using the ion exchange resin or the like can be reduced. However, an ion exchange resin can also be used as needed.

Further, for example, even if the reaction vessel 1 in the form of an open-type container having an open upper end or the like is used, the stirring as described above can allow the reaction efficiency of the carbon dioxide gas to be efficiently increased. Therefore, it is preferable to use the reaction vessel 1 in the form of the open-type container in place of a closed-type container, in terms of reduced equipment costs.

When such an open-type container shaped reaction vessel 1 is used or the like, an increased rate of the carbon dioxide gas fed to the liquid 2 in the reaction vessel 1 may lead to an increased amount of unreacted carbon dioxide gas leaking to the outside of the reaction vessel 1.

In order to prevent this, the rate of the carbon dioxide gas fed to the liquid 2 in the reaction vessel 1 is preferably 0.6 L/min/L or less, and more preferably 0.4 L/min/L or less.

This can allow a rate of the carbon dioxide gas dissolved in the liquid 2 to be made close to a rate of the crude lithium carbonate dissolved, thereby effectively preventing the unreacted gas to leak out. On the other hand, if the rate of the carbon dioxide fed is too slow, the reaction efficiency will reach a plateau, while the power costs will increase, and relative costs may increase. Therefore, the rate of the carbon dioxide gas fed to the liquid 2 can be, for example, 0.2 L/min/L or more, and preferably 0.3 L/min/L or more.

Although not shown, the carbon dioxide gas can be fed so as to be sprayed onto the stirring blade of the reaction vessel 1, for example, and in this case, the carbon dioxide gas rises upward while being stirred in the liquid 2 and reacting. This can allow the bubbles of the carbon dioxide gas to be crushed by the stirring blade, thereby providing a more finer bubble diameter.

When repulping the crude lithium carbonate before dissolution, pure water is preferably used in an amount that a Li concentration is from 7 g/L to 9 g/L, assuming that the total amount of the crude lithium carbonate is dissolved in the pure water at 25° C. The Li concentration is in a range close to the solubility as lithium hydrogen carbonate and varies depending on temperatures. Therefore, it is desirable to appropriately adjust the Li concentration in the range according to the temperature during repulping. More preferably, pure water is used in such an amount that the Li concentration is from 8 g/L to 9 g/L, assuming that the total amount of the crude lithium carbonate is dissolved in the pure water at 25° C.

When the carbon dioxide gas is blown into the pure water after repulping, 1.0-fold mol equivalent to 3.0-fold mol equivalent, particularly 1.3-fold mol equivalent to 2.0-fold mol equivalent, of carbon dioxide gas, is preferably blown, in the above assumed reaction. If an amount of the carbon dioxide gas is too high, there is a concern that Ca as a component to be removed may be dissolved, and if it is too low, the dissolution of lithium carbonate may be insufficient, resulting in a loss of lithium as a component to be recovered. In this embodiment, the amount of the carbon dioxide gas used can be reduced by stirring as described above, so that the production costs can be effectively reduced.

An end point of reaction can be controlled by the pH. Specifically, the blowing of the carbon dioxide gas can be stopped at the time when the pH reaches, for example, 7.6 to 7.9, and particularly preferably 7.6 to 7.7. This can allow Ca to be separated leaving it as a residue. Here, this utilizes the property that the solubility of calcium sulfate is sufficiently lower than that of calcium carbonate and calcium hydrogen carbonate.

(Decarbonization Step)

After the dissolution step, the Li dissolved solution obtained in that step is heated to release carbonic acid, and Li ions in the Li dissolved solution are precipitated as lithium carbonate.

Here, the Li dissolved solution can be concentrated by heating it to a temperature of preferably from 50° C. to 90° C., and the carbonic acid can be released from the Li dissolved solution as a carbon dioxide gas. The solubility of lithium hydrogen carbonate is decreased as the temperature is increased. In the decarbonization step, a difference in the solubility between lithium hydrogen carbonate and lithium carbonate can be used to effectively crystallize Li, which is sufficiently dissolved in the Li dissolved solution due to the production of lithium hydrogen carbonate as lithium carbonate by heating.

If the heating temperature of the Li dissolved solution is less than 50° C., there is a concern that carbonic acid will not be effectively released. On the other hand, if the heating temperature is more than 90° C., a defect due to boiling may occur, so that the upper limit can be 90° C. From this point of view, the heating temperature of the lithium dissolved solution is more preferably from 70° C. to 80° C.

In this case, the solution can be heated and concentrated about 3 times in a volume ratio. However, even if it is heated and concentrated until it evaporates to dryness, a recovery rate of Li can be improved without significantly affecting the impurity quality.

Lithium carbonate having relatively high quality can be obtained by the decarbonization step.

(Washing Step)

After the decarbonization step, a washing step of washing lithium carbonate may be carried out depending on the impurity quality of lithium carbonate and other conditions. However, this washing step after the decarbonization step can be omitted.

The washing step can be carried out under the same conditions and methods as those of the washing step before the dissolution step. This may allow impurities derived from attached water that may be contained in lithium carbonate, for example, $SO_4$, and further Na to be removed. An increased amount of washing water in this washing step may not improve the impurity quality of soluble components, in which case such impurities may be trapped in the crystals at the stage of the decarbonization step.

When a concentration ratio during heating in the decarbonization step is higher, it is preferable to carry out the washing step in terms of further removing impurities.

(Lithium Carbonate)

The lithium carbonate obtained as described above preferably has a purity of lithium carbonate of preferably 99.2% by mass or more, and more preferably 99.5% by mass or more.

In particular, the production of lithium carbonate by the above production method can allow the content of sodium in lithium carbonate to be 100 ppm by mass or less. Sodium may interfere with the movement of the lithium ions, for example, when the lithium carbonate is used in the production of a lithium ion battery. Therefore, it is effective that the concentration of sodium can be reduced in such a manner. The sodium content of lithium carbonate can be further 80 ppm by mass or less and 50 ppm by mass or less.

Further, according to the production method using the lithium ion battery waste as a raw material as described above, the chlorine content of lithium carbonate can be 10 ppm by mass or less. Since chlorine is compounded with a lithium compound in the lithium ion battery and has a moisture absorbing property, it is preferable that the chlorine content is lower. In general, lithium carbonate is often produced from seawater. The lithium carbonate produced from seawater is difficult to reduce the chlorine content as described above.

It should be noted that the contents and purities of sodium and chlorine as stated above are measured by ion chromatography with an automatic sample combustion device.

Such lithium carbonate can be used for various applications, and in particular, it can be effectively used for the production of lithium ion batteries.

EXAMPLES

Next, the method for producing lithium carbonate as described above was experimentally carried out and its effects were confirmed as described below. However, the descriptions herein are merely for the purpose of illustration and are not intended to be limited thereto.

<Carbonic Acid Dissolution>

After repulping crude lithium carbonate with pure water, a carbon dioxide gas was blown into the solution to redissolve the carbon dioxide gas as a lithium hydrogen carbonate solution. A pulp concentration during repulping in this case was set such that a concentration of lithium in the solution was 8.0 g/L when the total amount of the crude lithium carbonate was dissolved as the lithium hydrogen carbonate solution, based on the Li quality in the crude lithium carbonate.

(Feed Rate of Gas)

Figure 4:
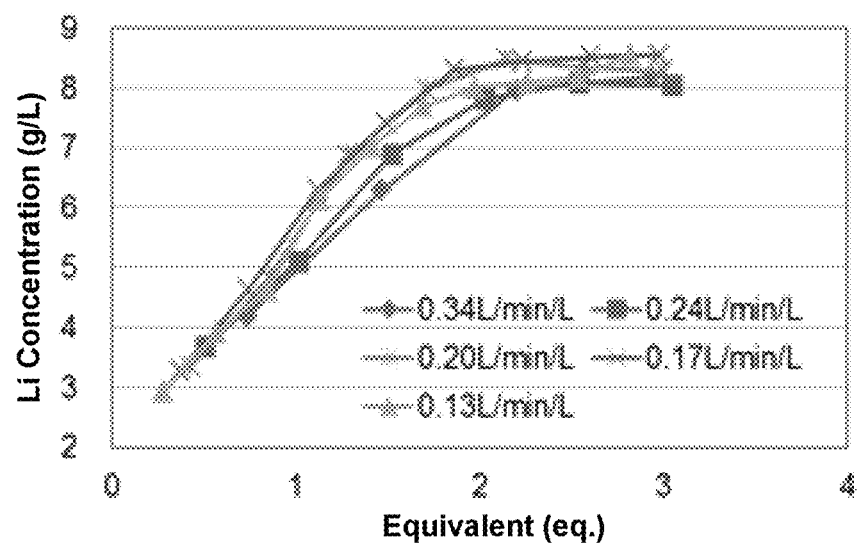
FIG. 4 is a graph showing a change in a Li concentration with respect to a change in a gas feed amount at different feed rates of a carbon dioxide gas in Example.
Figure 5:
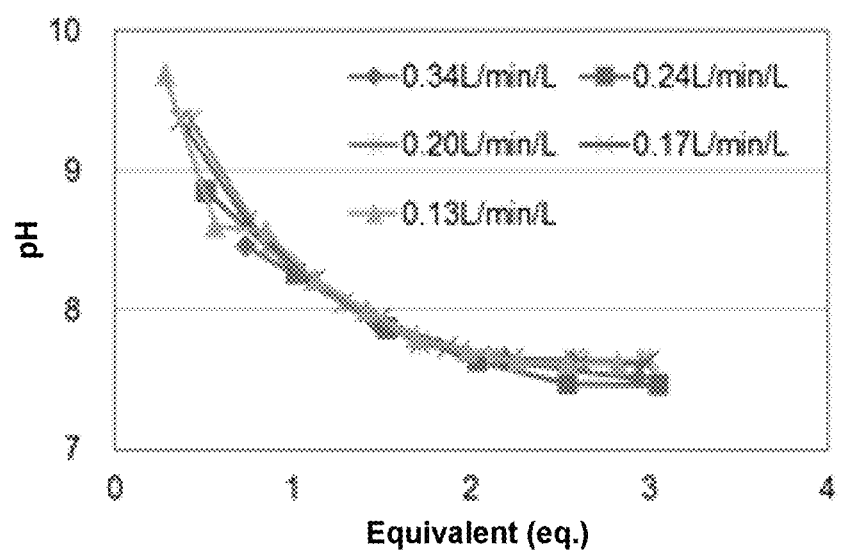
FIG. 5 is a graph showing a change in a pH with respect to a change in a gas feed amount at different feed rates of a carbon dioxide gas in Example.

The carbon dioxide gas was fed from a cylinder and blown at a constant flow rate. FIG. 3 shows a reaction efficiency of the carbon dioxide gas with changed addition rates (feed rates) of the carbon dioxide gas during the blowing. Further, FIGS. 4 and 5 show a change in the Li concentration and a change in pH with respect to a change in a gas feed amount, at each addition rate of the carbon dioxide gas, respectively.

It is understood from this result that as the addition rate of the carbon dioxide gas rate is lower, the lithium concentration in the solution when the carbon dioxide gas is blown until the target Li concentration is reached tends to be higher, so that the reaction efficiency of the carbon dioxide gas is higher. The addition rate of the carbon dioxide gas is calculated by the equation: (addition rate of carbon dioxide gas: L/min/L)=(flow rate of carbon dioxide gas: L/min)/(slurry capacity: L).

The end point of the reaction can be at a pH of from 7.6 to 7.7, and Li is dissolved at the maximum while maintaining impurities at the minimum dissolution.

(Stirring Rate)

Figure 6:
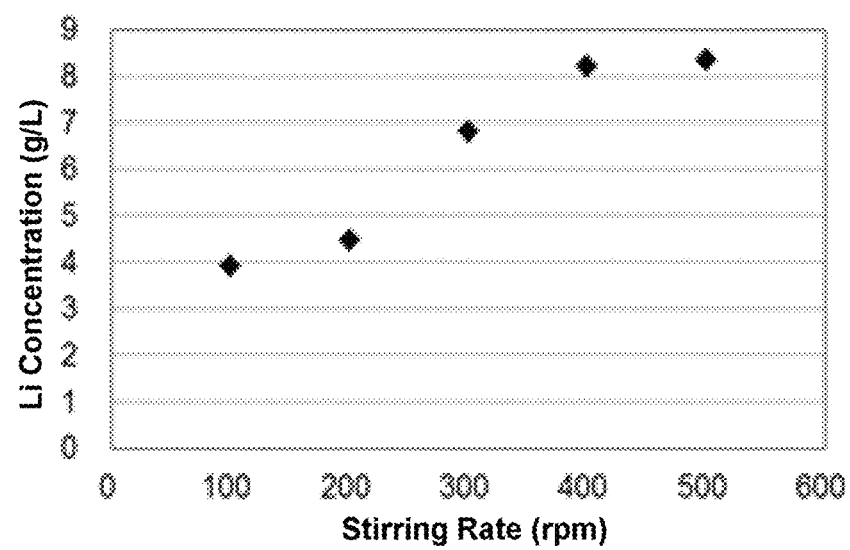
FIG. 6 is a graph showing a change in a Li concentration with changed stirring rates in Example.

FIG. 6 shows a graph illustrating a change in the Li concentration in the solution with changed stirring rates.

It is understood from FIG. 6 that, as the stirring rate of the slurry during the addition of the gas is higher when the carbon dioxide gas is blown to 3.0-fold mol equivalent, the Li liquid concentration tends to increase, and the rotation speed at a certain level or more increase the gas reaction efficiency. However, it is considered that the threshold value of the rotation speed at which the gas reaction efficiency is higher varies depending on the reaction systems.

(Stirred State)

Figure 7:
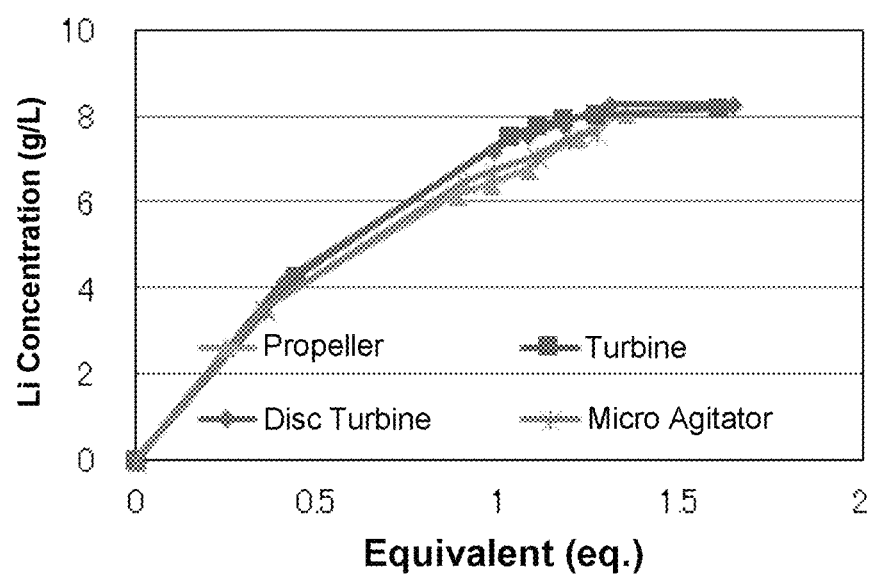
FIG. 7 is a graph showing a change in a Li concentration with respect to a change in a feed amount of a carbon dioxide gas in different blade shapes of a stirrer in Example.
Figure 8:
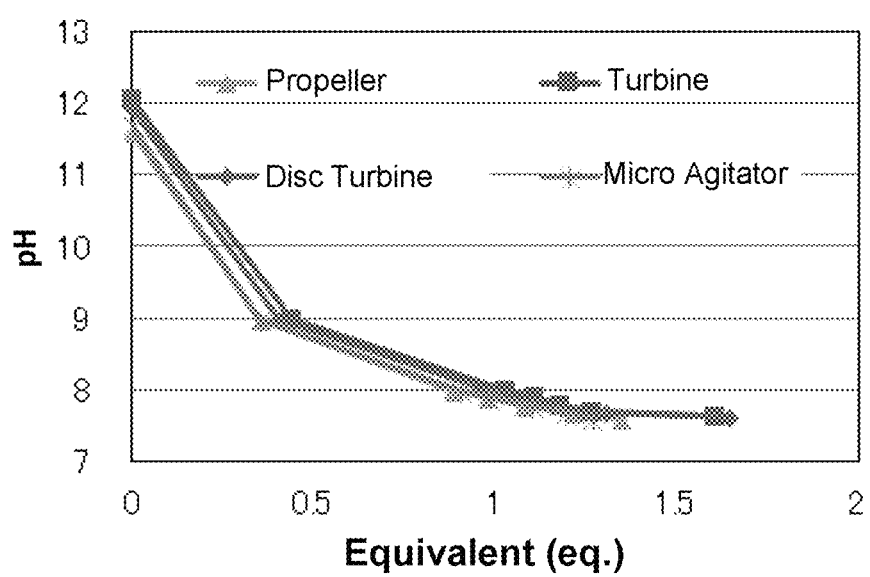
FIG. 8 is a graph showing a change in a pH with respect to a change in a feed amount of a carbon dioxide gas in different blade shapes of a stirrer in Example.

FIGS. 7 and 8 show graphs of changes in the Li concentration and pH with respect to a change in the amount of carbon dioxide fed, with changed blade shapes of the stirrer used for stirring, respectively. Here, a stirring power (P=Np× $n^3$×$d^5$; P: stirring power; Np: number of power; n: number of rotations; d: blade diameter) was considered. The number of power is an inherent value in each blade shape. Among these, the propeller was: n=500 rpm and d=60 mm. Further, the turbine and the disc turbine were: n=400 rpm and d=70 mm. Further, the micro agitator (trade name: from SHIMAZAKI MIXING ENGINEERING CO., LTD.) was: n=700 rpm and d=50 mm.

Figure 9:
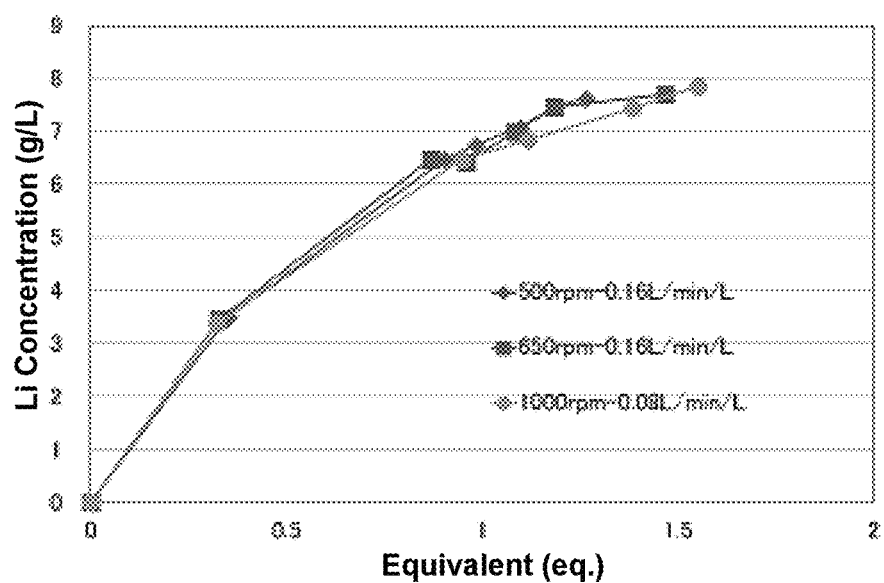
FIG. 9 is a graph showing a change in a Li concentration with respect to a change in a feed amount of a carbon dioxide gas in Example.
Figure 10:
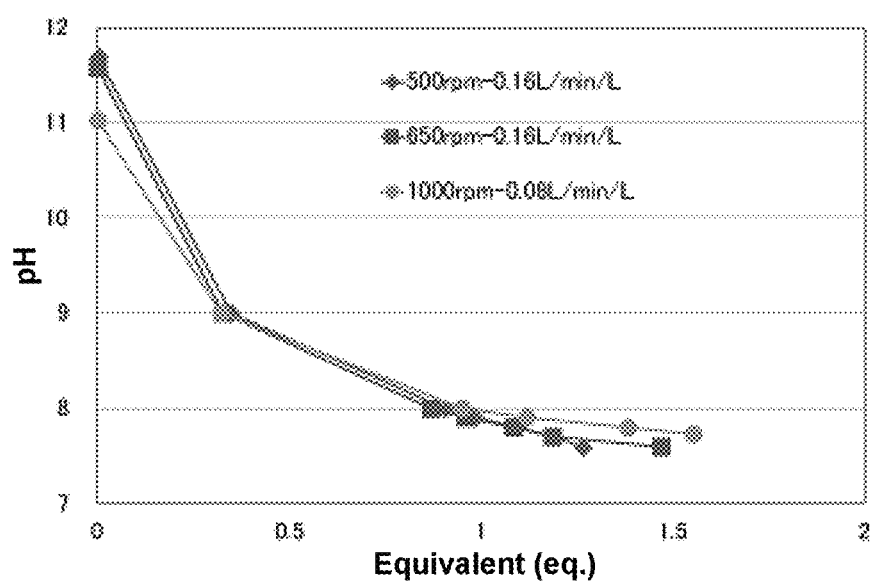
FIG. 10 is a graph showing a change in a pH with respect to a change in a feed amount of a carbon dioxide gas in Example.

Further, FIGS. 9 and 10 show graphs illustrating changes in the Li concentration and pH with respect to a change in an amount of a carbon dioxide fed, with respect to effects of the stirring rate and the addition rate of the gas on the stirring blades having the same shape. A micro agitator was used as the stirring blade.

As can be seen from these graphs, the fixed ratio of the blade diameter to the diameter of the reaction vessel provided the same results regardless of the shapes.

From the above results, it was found that it was preferable to increase the stirring rate and decrease the addition rate of the gas, but if they were excessive, the reaction time was only extended.

<Decarbonization>

The crude lithium carbonate was heated to 50° C. or more to release carbonic acid and recrystallize lithium carbonate. Since the qualities other than Na and $SO_4$ qualities were decreased at the stage of the crude lithium carbonate, impurities were precipitated as calcium carbonate and sodium sulfate even if the impurities were precipitated by evaporation to dryness. Therefore, the impurities could be reduced to a level that was not problematic for the use of batteries by washing with water.

By evaporation to dryness, two drying processes are required, but any load on the water balance in the system can be reduced.

Table 1 shows the qualities of crude lithium carbonate (before purification) and lithium carbonate (after purification) that have undergone the above steps. It is understood from Table 1 that the content of impurities is sufficiently reduced.

TABLE 1

| (ppm) | | Na | Ca | SO4 |
|---|---|---|---|---|
| Before Purification | | 3,700 | 490 | 5,600 |
| After Purification | Unwashed | 4,300 | 71 | 7,600 |
| | Washed | 77 | 71 | 310 |

DESCRIPTION OF REFERENCE NUMERALS

1: reaction vessel
2: liquid
3: stirrer
4: stirring blade
D: inner diameter of reaction vessel
H: height of liquid in reaction vessel
D: diameter of stirring blade

The invention claimed is:

1. A method for producing lithium carbonate from lithium ion battery waste, the lithium ion battery waste comprising battery positive material components containing Li and at least one metal selected from Co, Ni and Mn, wherein the method comprises:
   a wet process, wherein the at least one metal of the battery positive material components is separated from the lithium ion battery waste to obtain crude lithium carbonate,
   a dissolution step of dissolving the crude lithium carbonate in a liquid while feeding a carbon dioxide gas; and
   a decarbonization step of heating a lithium dissolved solution obtained in the dissolution step to release carbonic acid, and
   wherein when dissolving the crude lithium carbonate in the liquid in the dissolution step, the liquid is stirred in a reaction vessel using a stirrer, and a ratio of a diameter (d) of a stirring blade of the stirrer to an inner diameter (D) of the reaction vessel (d/D) is from 0.2 to 0.5.

2. The method according to claim 1, wherein, in the dissolution step, a ratio (P/V) of a stirring power (P) of the stirrer to a volume (V) of the liquid with the crude lithium carbonate introduced is from 0.3 kW/m³ to 1.0 kW/m³.

3. The method according to claim 1, wherein, in the dissolution step, a peripheral speed of the stirrer is from 1.3 m/s to 1.9 m/s.

4. The method according to claim 1, wherein, in the dissolution step, a rate of the carbon dioxide gas fed to the liquid is 0.6 L/min/L or less.

5. The method according to claim 1, further comprising a washing step of washing the crude lithium carbonate before the dissolution step.

6. The method according to claim 5, wherein the washing step comprises a washing operation, wherein in the washing operation, the crude lithium carbonate is brought into contact with pure water, the water being present in an amount that is 0.5 to 2 times a wet weight of the crude lithium carbonate, then the water and crude lithium carbonate are stirred to form a slurry, and then a solid-liquid separation of the slurry is performed to recover the crude lithium carbonate.

7. The method according to claim 6, wherein in the washing step, the washing operation is carried out a plurality of times.

8. The method according to claim 1, wherein, after the wet process and prior to the dissolution step, the following steps are carried out:
 a pH-increasing step of increasing a pH of an acidic solution obtained after separating the at least one metal of the battery positive electrode material components from the lithium ion battery waste; and a carbonization step of carbonizing Li in the solution obtained in the pH-increasing step.

9. The method according to claim 8,
wherein the acidic solution comprises Ni ions and Mg ions; and
wherein the pH-increasing step comprises increasing a pH of the acidic solution to 12.0 to 13.0.

10. The method according to claim 8,
wherein the acidic solution comprises Ni ions, but does not comprise Mg ions; and
wherein the pH-increasing step comprises increasing a pH of the acidic solution to 10.0 to 10.5.

11. The method according to claim 1, wherein the dissolution step comprises bringing the crude lithium carbonate into contact with pure water, then stirring the water and crude lithium carbonate to form a slurry and then feeding carbonate ions to the slurry to dissolve the crude lithium carbonate.

12. The method according to claim 11, wherein, in the dissolution step, the pure water is used in an amount that a Li concentration is from 7 g/L to 9 g/L, assuming that the total amount of the crude lithium carbonate is dissolved in the pure water at 25° C.

\* \* \* \* \*